Oct. 24, 1967  H. PRIEUR  3,348,399
METHODS OF AND APPARATUS FOR FORMING TUBULAR MEMBERS
Filed Aug. 4, 1964  5 Sheets-Sheet 1
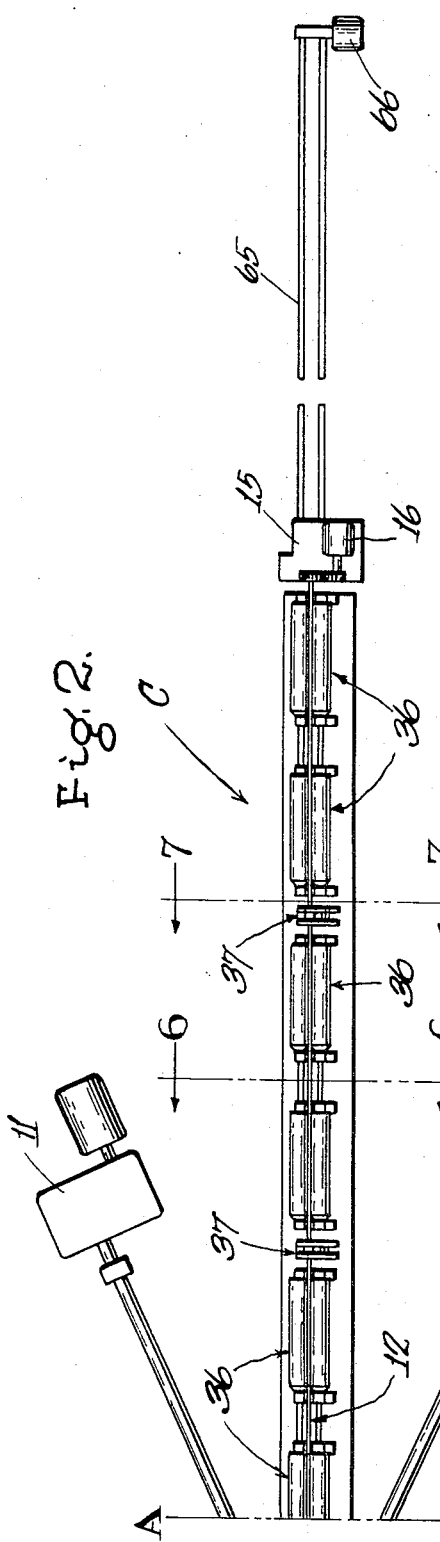
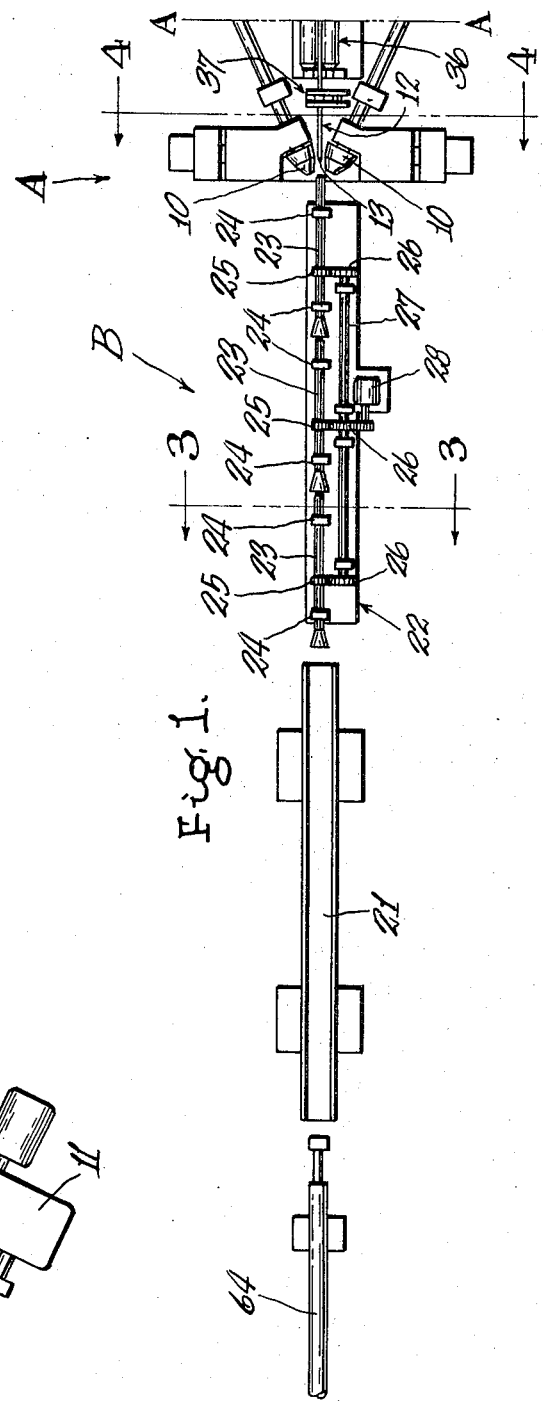
INVENTOR.
HUBERTUS PRIEUR
BY
Williams and Kreske
ATTORNEYS

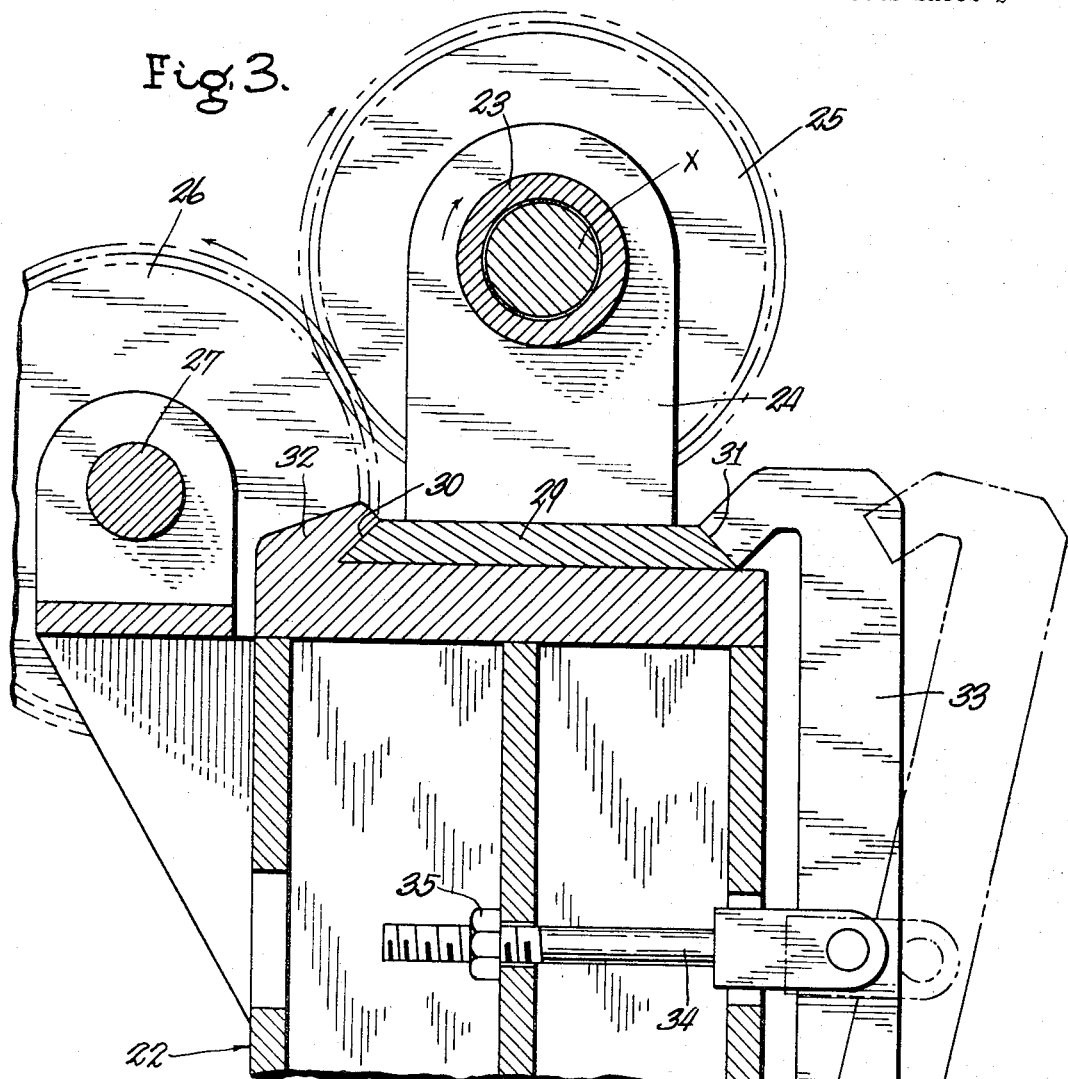
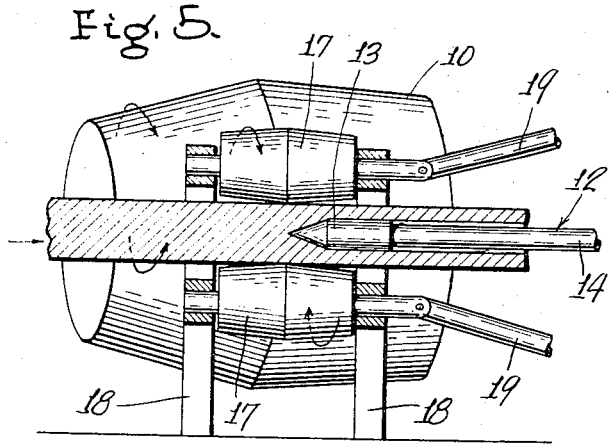
INVENTOR.
HUBERTUS PRIEUR

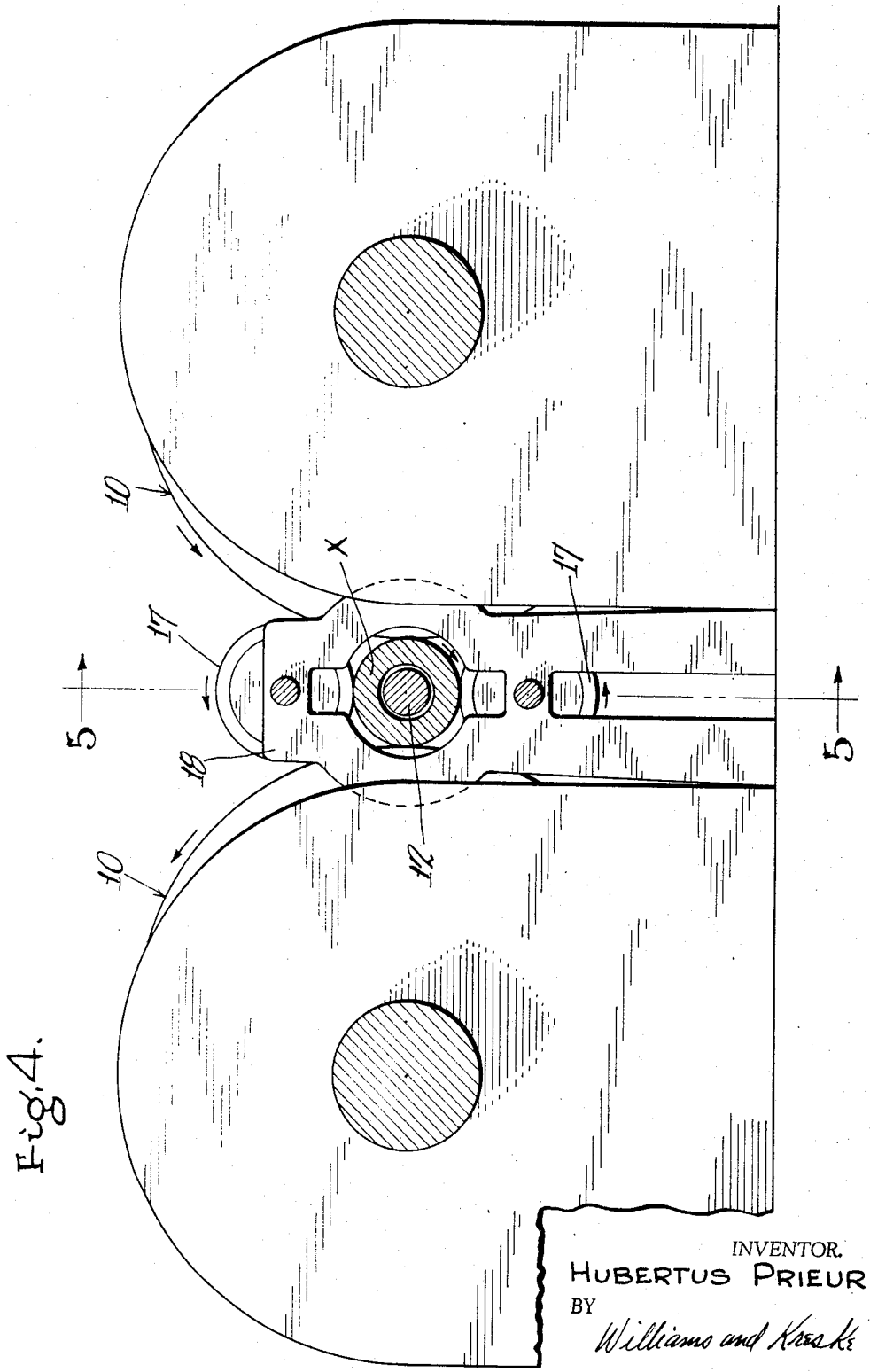

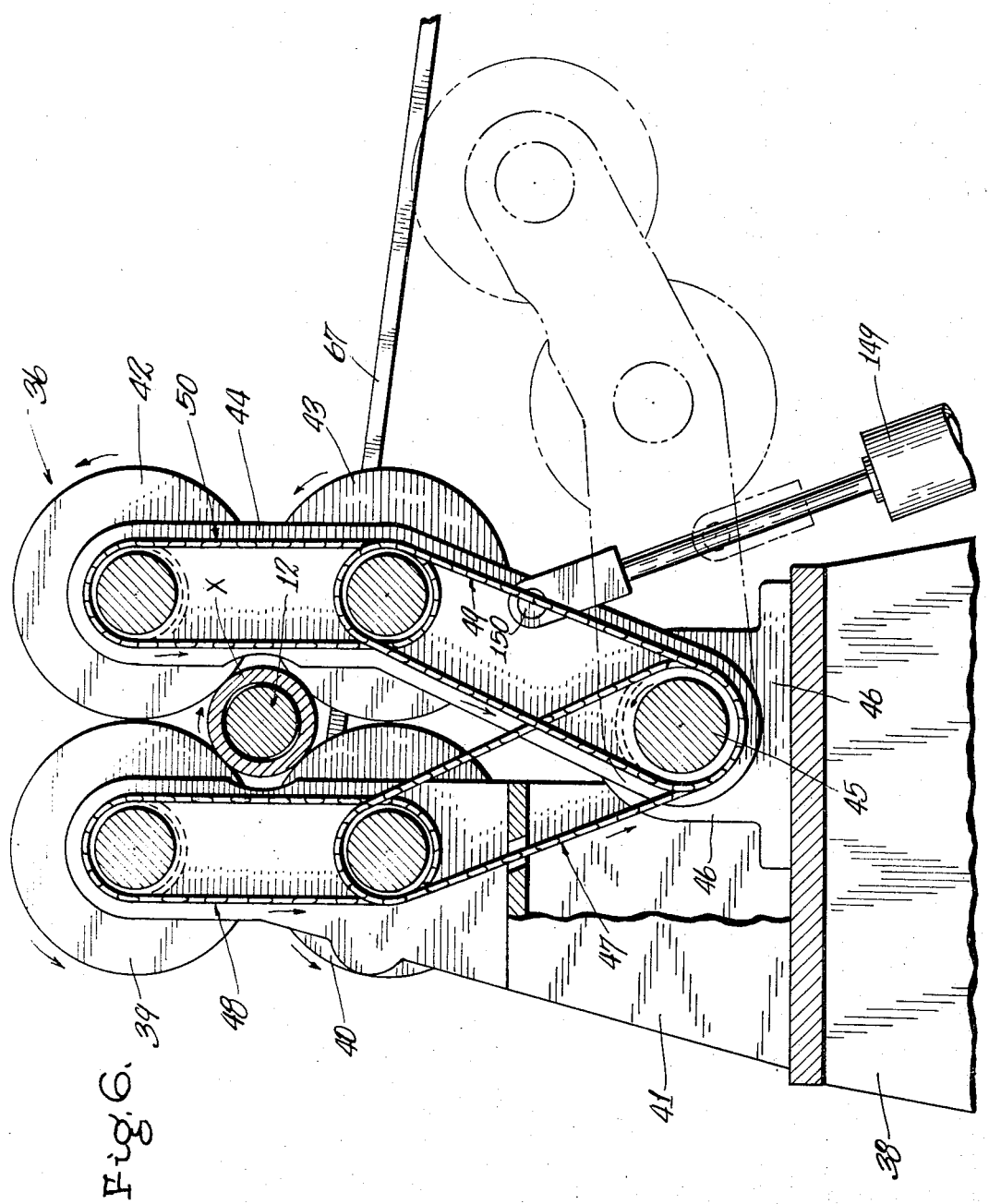

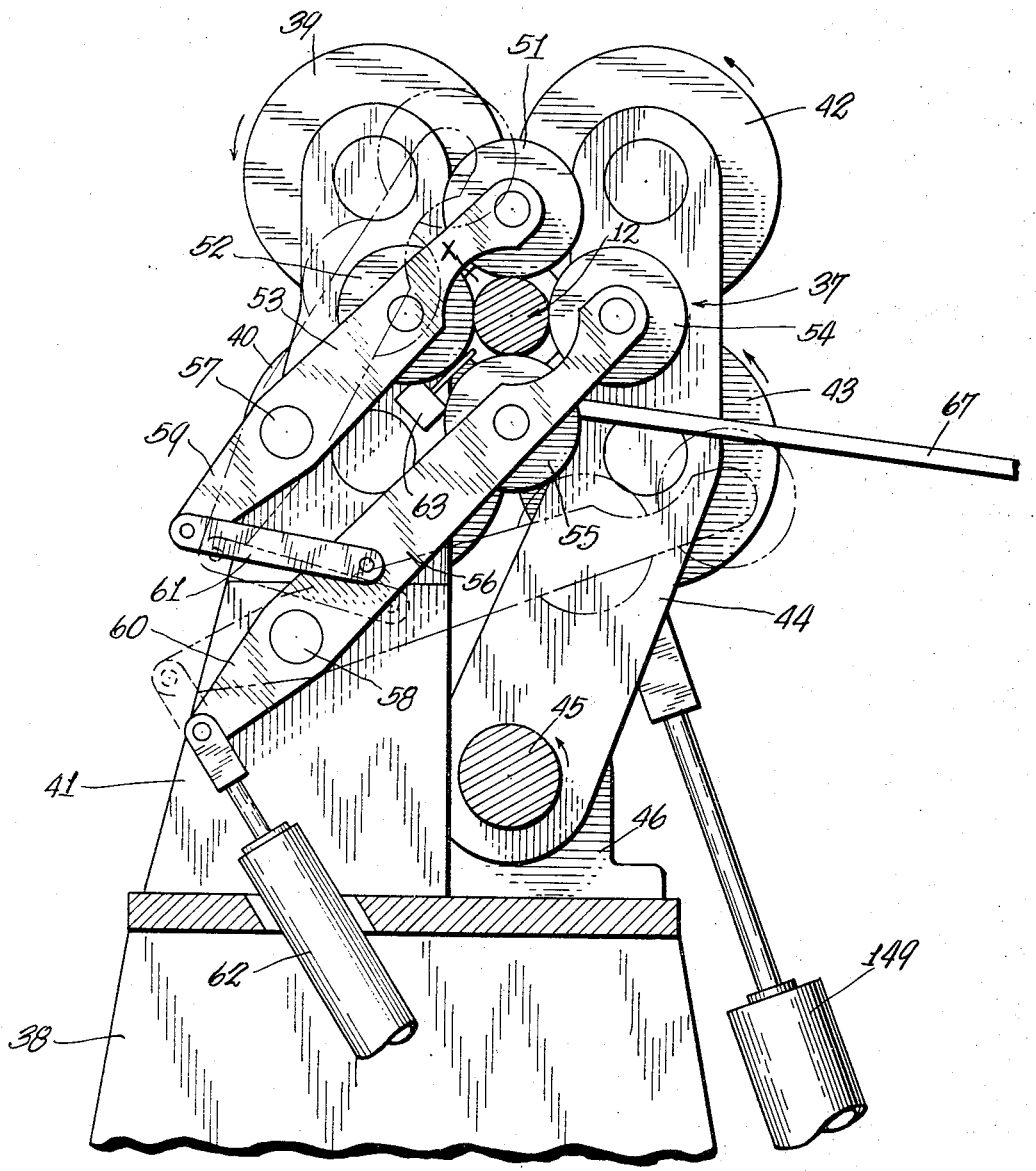

United States Patent Office 3,348,399
Patented Oct. 24, 1967

3,348,399
METHODS OF AND APPARATUS FOR
FORMING TUBULAR MEMBERS
Hubertus Prieur, Youngstown, Ohio, assignor to The
McKay Machine Company, Youngstown, Ohio
Filed Aug. 4, 1964, Ser. No. 387,445
15 Claims. (Cl. 72—97)

ABSTRACT OF THE DISCLOSURE

Methods of and apparatus for forming metallic tubular members from heated elongated bodies by longitudinally piercing the latter during rotation thereof at a forming station and longitudinally advancing such bodies past the station. The bodies are enclosed to reduce heat loss prior to the forming operation and a body and the resultant tubular member formed therefrom is positively rotated from end to end, on both sides of the forming station, at a speed corresponding to that imparted by the forming station to obviate torsional displacement of the body and resultant tube.

---

The present invention relates to methods of an apparatus for forming an elongated tubular metallic member from an elongated cylindrical body and the principal object of the invention is to provide new and improved methods and apparatus of the character described.

In making seamless metal tubing or tubular members, it has been common practice to pierce a cylindrical body longitudinally by forcing such body over a mandrel. In such operation, material at the center of the body is displaced radially outwardly. However, in conventional piercing apparatus and with conventional methods, it is not commercially practical to pierce a copper body whose initial length before piercing is more than about ten feet long because of the high rate of slippage between the body and the work rolls which force the body over the mandrel.

In contrast, by reducing slippage between the work rolls and the cylindrical body, it is commercially practical to pierce copper bodies having an initial length of over twenty feet. This is highly desirable since it permits a single piece of tubing to be made in a length more than double that which was heretofore possible. Moreover, the present invention provides a better product since it eliminates the torsional deflection of the body, especially after piercing, which frequently resulted when prior art methods and apparatus were used. These and other advantages will readily become apparent from a study of the following description and from the appended drawings.

In the drawings accompanying this specification and forming a part of this application there is shown, for purpose of illustration, an embodiment which the invention may assume, and in these drawings:

FIGURES 1 and 2 are top plan views of respective portions of apparatus embodying the present invention, such views being adapted to be joined at the plane A—A, FIGURE 3 is an enlarged fragmentary view, in vertical section, generally corresponding to the line 3—3 of FIGURE 1, FIGURE 4 is an enlarged fragmentary view, in vertical section, generally corresponding to the line 4—4 of FIGURE 1, FIGURE 5 is a reduced size sectional view generally corresponding to the line 5—5 of FIGURE 4, and FIGURES 6 and 7 are enlarged, fragmentary views, in vertical section, generally corresponding to respective lines 6—6 and 7—7 of FIGURE 2.

With reference to FIGURES 1 and 2, the apparatus herein shown may conveniently be divided into a roll pass section A, a stock entry section B, and a stock exit section C. In brief, the tubular body, or stock, will be disposed at the entry section B and will move to the right through the roll pass section A and thence to the exit section C. In passing through the roll pass section A, the cylindrical stock will be longitudinally pierced to form it into a tubular member.

Turning first to the roll pass section A and with reference to FIGURES 1 through 5, a pair of opposed rolls 10, 10 form a pass through which the cylindrical stock, or body, X travels. In the conventional manner, the axes of such rolls are both horizontally and vertically inclined relative to the line of stock travel so that the stock will not only be rotated by the rolls but will also be advanced from left to right, in the position of parts seen in FIGURES 1 and 4, through the roll pass. Rolls 10 are adapted to be rotated by suitable respective drive mechanisms 11.

As best seen in FIGURES 1 and 5 wherein certain later to be described parts are omitted in the interest of clarity, a mandrel 12 is positioned concentrically with the stock X as it passes through the roll pass. The leading, or working, end 13 of the mandrel is positioned to engage the stock immediately after it enters the roll pass and such end is supported by a slightly reduced diameter shank 14 which extends along the exit section of the apparatus and is anchored to a carriage 15 (FIGURE 2). Carriage 15 is provided with an adjustable speed motor 16 or other suitable drive mechanism to effect rotation of the mandrel 12 in a manner to be disclosed.

With the construction thus far described, the rolls 10 forming the roll pass advance the stock X from left to right and over the mandrel 12 in the conventional manner so that the latter longitudinally pierces the stock by displacing material at the center of the stock radically outwardly. In so piercing the stock, the latter will be considerably elongated and in the present embodiment, such stock will be about three times as long after piercing as it was prior thereto. It will be appreciated that considerable force must be exerted on the stock by the rolls 10 and to assist the latter in rotating the stock, the mandrel 12 is rotated by the motor 16 in the same direction and at a speed at least as great as the rotational speed imparted to the stock by the rolls 10. This rotation of the mandrel increases piercing speed since, as it assists the rolls in rotating the stock rather than creating an impediment to stock rotation as is true in prior art apparatus, it tends to reduce slippage between the stock and the rolls.

Turning now to FIGURES 3 and 4, it will be understood that when a pair of opposed working rolls are employed as herein shown, there may be a tendency for the stock to deflect transversely, either upwardly or downwardly in the present instance, and thus escape passing through the center of the pass provided by the rolls 10. Heretofore, it has been proposed to limit transverse movement of the stock by positioning guide blocks between the rolls forming the pass, one block being disposed above the pass and the other being disposed below the pass. While this functions to keep the stock centered in the roll pass, the friction which results from abutment of the stock with the blocks tends to impede stock movement and thus cause slippage between the stock and the pass rolls.

To obviate the use of guide blocks with their attendant disadvantages, the present apparatus provides opposed rollers 17 respectively positioned above and below the stock for peripheral engagement therewith as it passes between the pass formed by the rolls 10. Rollers 17 are suitably supported for rotation by a bracket structure 18 and, in the present instance, to eliminate any frictional drag whatsoever on the moving stock, rollers 17 are preferably driven by a suitable variable speed drive device, through the jointed shafts 19, in the direction shown and at a peripheral speed at least as great as the speed imparted to the stock by the rolls 10. Thus, the rollers 17 may actually assist the rolls 10 in rotating the stock. While rollers 17 are herein shown with their axes parallel to the axis of the stock so as to impart only rotational movement thereto, it will readily be apparent that such rollers could as well be skewed to also impart the same axial movement to the stock as is imparted thereto by the rolls 10. Also, while omitted in the interest of simplicity, it will be evident that means will usually be provided for adjustment of the spacing between the rolls 17 to accommodate various stock sizes.

Turning now to the entry section B of the apparatus and with reference to FIGURES 1 and 3, this section comprises an elongated, trough-like support 21 in axial alignment with the pass formed by rolls 10 but axially spaced therefrom. Support 21 is adapted to receive, from a conveyor or the like (not shown), the cylindrical body, or piece of stock, which is to be run through the pass provided by the rolls 10, 10 so as to longitudinally pierce the same.

Intermediate the trough-like support 21 and the roll pass is an entry table 22 presently mounting three rotatably supported sleeve members 23 in axially spaced and aligned relation with each other and with the roll pass. The internal diameter of the sleeve members is such as to closely but slidably receive the stock, the left, or entry end of each sleeve member being bell-mouthed to facilitate stock entry. Each sleeve member 23 is rotatably supported by axially spaced bearing housing 24 which are in turn removably secured to the table 22 in a manner to be described.

Affixed to each sleeve member 23 intermediate its bearing housings 24 is a gear 25 respectively meshed with gears 26 mounted on a parallel, jack shaft 27. Shaft 27 is adapted to be rotated by a suitable variable speed drive device, such as a motor 28, whereby the sleeve members 23 will be simultaneously rotated. Rotation of the sleeve members will be in a direction and at a speed to impart to the contained stock the same rotational direction and speed imparted to the stock by the roll pass hereinbefore described. By thus supporting the stock in the rotating sleeve members 23 while it is in the process of moving through the pass provided by the rolls 10, 10, frictional drag on the stock on the entry side of the roll pass is eliminated and therefore slippage between the stock and the rolls 10 is reduced. Furthermore, by rotating that portion of the stock on the entry side of the roll pass in the same direction and at the same speed as is imparted to the stock by the roll pass, torsional deflection of the stock is obviated. Finally, when as is the usual practice, the stock is heated prior to passage through the roll pass, confining the stock within the sleeve members tends to keep the stock at the desired working temperature by reducing heat losses therefrom.

Since the sleeve members 23 may be subjected to relatively rapid wear because of the elevated temperature at which they operate and since the bearings in housings 24 may be subjected to premature failure for the same reason, provision is made for ready and rapid replacement of a sleeve member-bearing housing assembly as will next be disclosed.

As best seen in FIGURE 3, each bearing housing 24 has a base 29 having upwardly inclined, opposed sides 30 and 31. Entry table 22 provides a seat for the bases 29 and a lip 32 for complementary engagement with the base side 30 to accurately locate the bearing housings with respect to the center of the roll pass. Pivotally secured to the entry table 22 is a clamp arm 33 whose upper end is formed for complementary engagement with the side 31 of bearing housing base 29. A bolt 34 has clevis connection with the arm 33 and a nut 35 draws the arm against the bearing base to tightly clamp the bearing housings and their supported sleeve members 23 to the entry table.

When a sleeve member 23 need be replaced because of wear or because of a damaged bearing or a gear 25, nuts 35 need only be loosened to permit the appropriate arms 33 to be shifted to the phantom-line position shown. The damaged assembly formed by a sleeve member 23, its two bearing housings 24 and its gear 25 may then quickly be removed and replaced with a new or re-built assembly. Following installation of a serviceable assembly, nuts 35 may be tightened to return the appropriate arms 33 to their full-line positions whereupon the bearing housings of the assembly will be firmly and accurately clamped in position.

It should be mentioned that while the present embodiment contemplates the use of three sleeve members 23, this is illustrative only and a greater or lesser number may be employed when warranted by circumstances.

With reference now to the exit section C of the apparatus, this section may conveniently be divided into longitudinally spaced sets of stock-support rollers 36 and mandrel-support rollers 37 as best illustrated in FIGURES 1 and 2. In the present embodiment, six sets of elongated rollers 36 and 3 sets of rollers 37 are mounted on an elongated base 38. Two roller sets 37 are presently shown interposed between pairs of roller sets 36 while one roller set 37 is disposed adjacent the pass provided by the working rolls 10; however, the present roller arrangement is illustrative only and a different arrangement could as well be used.

As best seen in FIGURE 6 wherein a roller set 36 is illustrated, each roller set 36 presently comprises a pair of elongated rollers 39, 40 rotatably supported in vertically spaced relation on the left side (in the position of parts shown) of the stock by a bracket 41 mounted upon the base 38. Similarly, a pair of rollers 42, 43 are disposed on the right side of the stock; however, rollers 42, 43 are rotatably carried by an arm 44 which is pivotably supported by a shaft 45. As will be evident from FIGURE 6, rollers 39, 40, 42 and 43 form a pass for the stock; however, the stock is gripped but lightly by such rolls so as not to impede axial stock travel. Shaft 45 extends between all of the roller sets 36 and is rotatably supported by suitable bearings 46. A suitable chain and sprocket drive 47 connects roll 40 with the shaft 45 while a similar chain and sprocket arrangement 48 connects the roll 39 to the roll 40. Similarly, chain and sprocket arrangements 49, 50 respectively connect the shaft 45 to the roller 43 and the latter to the roller 42. The arrangement is such that rotation of shaft 45 by a variable speed motor device or the like (not shown) effects rotation of rollers 39, 40, 42 and 43 to in turn rotate the stock in the same direction and at the same speed as is imparted to the stock by the rolls 10, 10.

For a purpose later to appear and as previously mentioned, the arm 44 which rotatably supports the rolls 42, 43 is pivotable about the axis of shaft 45. Such arm is normally maintained in the full-line position shown by means of a fluid cylinder 149 whose piston rod is pivoted to the arm at 150. Upon operation of cylinder 149 to retract its piston rod, arm 44 and its supported rolls 42, 43 will be shifted to the phantom-line position for a purpose to appear. To facilitate entry of the stock between the roller sets 36, the left end of each of the rollers 39, 40, 42 and 43 may be beveled as shown in FIGURES 1 and 2. Still referring to the last-mentioned figures and in the present embodiment, the first two sets of rollers 36 adjacent the pass formed by rolls 10 are unitary; i.e., the shafts on which rollers 39, 40, 42 and 43 are mounted extend between and connect corresponding rollers of the two sets. Similarly, the second two sets of rollers 36 are unitary as are the final two sets. Accordingly, only three cylinders 149 need be employed to shift the arms 44 of the roller sets 36, one for each of the unitary pairs of roller sets above-described.

Turning now to the roller sets 37 and as best seen in FIGURE 7, each roller set 37 comprises a pair of rollers 51, and 52 rotatably carried by an arm 53 and a pair of rollers 54, 55 rotatably carried by an arm 56. As illustrated, rollers 51, 52, 54 and 55 are spaced about the mandrel shank 14 and are engaged therewith to cooperably support the latter against transverse deflection. Arms 53, 56 are supported on respective pivots 57, 58 carried by an adjoining roll stand 41 and each arm has respective portions 59, 60 extending beyond its pivot. A link 61 connects arm portion 59 with arm 56 while a fluid cylinder 62 is connected to the portion 60 of arm 56 to shift both arms between their full and phantom-line positions for a purpose to appear.

In the position of parts seen in FIG. 7, cylinder 62 maintains the arms 53, 56 in their full-line positions wherein their rollers engage and support the mandrel. When, however, a piece of stock has moved through the pass provided by the rolls 10, 10 and over the mandrel an amount to reach a roller set 37, it is necessary to move such rollers apart to allow unimpeded passage of the stock. For this purpose and still referring to FIGURE 7, a switch or the like 63 may have its actuator positioned for engagement with the stock just before the leading end of the latter reaches a respective roller set 37.

In operation and with the various driven parts rotating in the manner indicated in the several views, a piece of stock X will be disposed in the trough-like support 21 (FIGURE 1) and a fluid cylinder 64 or the like actuated to push the stock through the rotating sleeve members 23 so that the right end of such stock enters the pass provided by the rolls 10, 10. Upon entry of the stock between the rolls 10, 10, the cylinder 64 will be retracted since the rolls 10, 10 will effect subsequent advance of the stock to the right. Although it forms no part of the present invention, it is to be understood that the stock may be heated, if desired, prior to passage through the pass provided by the rolls 10, 10. For this purpose, an oven (not shown) may be provided adjacent the trough-like support 21 or other suitable expedients may be employed for such purpose.

As the stock passes between the rolls 10, 10 and moves to the right to the exit section C of the apparatus, it will be pierced by the mandrel 12, as previously described, since the mandrel is at this time positioned with its head, or working end 13, disposed to engage the stock immediately after it enters between the rolls 10, 10.

Upon movement of the pierced end of the stock over the rotating mandrel, the approach of its leading end to the first roll set 37 will be signalled by the appropriate switch 63. This will actuate cylinder 62 to shift the arms 53, 56 from the full-line positions seen in FIGURE 7 to the phantom-line positions. Such movement of the arms will, of course, deprive the mandrel of the support previously provided by this roll set 37; however, it is to be understood that the mandrel will, at this point, now be surrounded by the pierced stock.

The pierced stock will advance along the exit section C of the apparatus, passing through and being supported by the roller sets 36. As the leading end of the stock reaches each roll set 37, such rolls will be separated, as hereinabove described, to provide for passage of the stock.

When the entire length of stock has passed between the rolls 10, 10, the mandrel 12 will be withdrawn from the pierced stock by shifting the carriage 15 to the right along its ways 65 (FIGURE 2) by means of a suitable mechanism 66. Arms 44 mounting the stock-support rollers 42, 43 may now be shifted from the full-line positions seen in FIGURE 6 to the phantom-line positions. This movement of the arms 44 along with the previous movement of the arms 53, 56, will leave the now pierced stock unsupported whereupon it may gravitate down inclined support tracks 67 and away from the apparatus exit section.

Following movement of the pierced stock along the inclined members 67, the mandrel 12 will be returned to the position seen in FIGURES 1 and 2 by moving its carriage 15 to the position illustrated and the arms 44, 53 and 56 will be returned to their full-line positions. Thus, the apparatus will be ready to receive the next piece of stock to be pierced.

In view of the foregoing it will be apparent to those skilled in the art that I have accomplished at least the principal object of my invention and it will also be apparent to those skilled in the art that the embodiment herein described may be variously changed and modified without departing from the spirit of the invention and that the invention is capable of uses and advantages not herein purposely described; hence it will be appreciated that the herein disclosed embodiment is illustrative only and that my invention is not limited thereto.

I claim:

1. The method of forming an elongated tubular member from an elongated cylindrical body, which comprises forcing one end of the body between the rolls of a pass, simultaneously rotating and longitudinally advancing said body through said pass with said rolls and over a mandrel to displace material at the center of said body radially outwardly, loosely confining substantially all of said body ahead of said pass within a sleeve, and rotating said sleeve and consequently the body confined therein in the same direction as and at at a speed generally coincidental with the rotational direction and speed imparted to said body by said pass.

2. The method of forming an elongated tubular member from an elongated cylindrical body, which comprises forcing one end of the body between the rolls of a pass, simultaneously rotating and longitudinally advancing said body through said pass with said rolls and over a mandrel to displace material at the center of said body radially outwardly, loosely confining substantially all of said body ahead of said pass within a sleeve, rotating said sleeve and consequently the body confined therein in the same direction as and at a speed generally coincidental with the rotational speed imparted to said body by said pass, and supporting a portion of said body which has emerged from said pass and rotating such body portion in the same direction as and at a speed generally coincidental with the rotational direction and speed imparted to said body by said speed.

3. Apparatus for forming an elongated tubular member from an elongated cylindrical body, comprising roll means forming a pass for the cylindrical body and arranged to simultaneously rotate and longitudinally advance said body, a mandrel at said pass and over which said body is forced by said roll means to displace material at the center of said body radially outwardly, sleeve means having an internal size to slidably receive said body and of a length to substantially completely encircle and enclose said body ahead of said pass, and means for rotating said sleeve means and consequently the encircled body in the same direction as and at a speed generally coincidental with the rotational direction and speed imparted to said body by said pass to assist said roll means in rotating said body thus reducing slippage therebetween and reducing torsional displacement of axially spaced body portions.

4. The construction of claim 3 wherein there are a plurality of sleeves in aligned, axially spaced relation each rotated by said means.

5. The construction of claim 3 wherein said sleeve is part of an assembly which includes axially spaced bearings in which said sleeve is journaled and wherein quick-attachable, quick-detachable means removably secures said assembly to a support in position to receive said cylindrical body portion.

6. The construction of claim 5 wherein said bearings are carried by bearing carrier means and wherein said quick-attachable, quick-detachable means secures said bearing carrier means to said support.

7. The construction of claim 6 wherein a fixedly positioned surface on said support is engageable with a corresponding surface on said bearing carrier means and wherein a shiftably mounted member removably maintains said bearing carrier means surface in close engagement with said fixedly positioned support surface.

8. Apparatus for forming an elongated tubular member from an elongated cylindrical body, comprising roll means forming a pass for the cylindrical body and arranged to simultaneously rotate and longitudinally advance said body, a mandrel at said pass and over which said body is forced by said roll means to displace material at the center of said body radially outwardly, a sleeve having an internal size to slidably receive said body and encircling a portion of the latter ahead of said pass, bearing means rotatably mounting said sleeve on a support, a first gear affixed to said sleeve and rotatable therewith, a second gear having driving engagement with said first gear, means for rotating said sleeve and consequently the encircled body portion in the same direction as and at a speed generally coincidental with the rotational direction and speed imparted to said body by said pass by effecting rotation of said second gear and thus rotation of said first gear to assist said roll means in rotating said body thus reducing slippage therebetween and reducing torsional displacement of axially spaced body portions, and means providing for quick removal of a sleeve from said support and replacement thereof with another sleeve when sleeve or bearing wear becomes excessive.

9. Apparatus for forming an elongated tubular member from an elongated cylindrical body, comprising roll means forming a pass for the cylindrical body and arranged to simultaneously rotate and longitudinally advance said body, a mandrel at said pass and over which said body is forced by said roll means to displace material at the center of said body radially outwardly, means supporting one portion of said body prior to entry thereof into said pass and supporting another portion of said body after emergence thereof from said pass, and means for rotating both body portions aforesaid in the same direction as and at a speed generally coincidental with the rotational direction and speed imparted to said body by said pass to assist said roll means in rotating said body thus reducing slippage therebetween and reducing torsional displacement of axially spaced body portions.

10. The construction of claim 9 wherein said one body portion supporting means comprises a rotatably mounted sleeve which encircles said one body portion and which has an internal size slidably receiving the latter, and wherein the body portion rotating means aforesaid effects rotation of said sleeve and consequent rotation of the encircled body portion.

11. Apparatus for forming an elongated tubular member from an elongated cylindrical body, comprising roll means forming a pass for the cylindrical body and arranged to simultaneously rotate and longitudinally advance said body, an elongated mandrel having a working end at said pass and a shank portion extending in the direction of body travel from such working end, means for rotating said mandrel in the same direction as said body is rotated by said pass and at a speed not appreciably slower than that imparted to said body by said pass to reduce slippage between said body and said roll means, a first set of rolls rotatably supporting a portion of said body which has emerged from said pass, a second set of rolls spaced axially of said body from said first roll set and rotatably supporting said mandrel shank portion to provide lateral support thereto, and means for rotating the rolls of said first roll set and thus the body portion engaged therewith in a direction and at a speed generally coincidental with the rotational direction and speed imparted to said body by said roll means thereby reducing slippage between said roll means and said body and reducing torsional displacement of axially spaced body portions.

12. The construction of claim 11 wherein a plurality of first and second roll sets are spaced axially of said body in alternating relationship.

13. The construction of claim 11 wherein said second set of rolls comprises a plurality of rolls spaced circumferentially about said mandrel and wherein means effects movement of such rolls radially outwardly away from said mandrel shank to provide for unobstructed passage therebetween of said body.

14. The construction of claim 11 wherein said first set of rolls comprises a plurality of rolls spaced circumferentially about said body portion and wherein means effects movement of at least one of said rolls transversely away from said body to provide for body movement transversely out of axial alignment with said roll means pass.

15. The construction of claim 11 wherein said first and second roll sets each comprises a plurality of rolls spaced circumferentially about said body portion and said mandrel respectively and wherein means effects movement of at least one of the rolls of each roll set radially outwardly with respect to the longitudinal axis of said mandrel and said body portion to provide for body movement transversely out of axial alignment with said roll means pass and to provide for unobstructed axial movement of said body between the rolls of said second roll set.

References Cited

UNITED STATES PATENTS

| | | | |
|---|---|---|---|
| 361,957 | 4/1887 | Mannesmann | 72—97 |
| 389,585 | 9/1888 | Mannesmann | 72—97 |
| 1,141,426 | 6/1915 | Simpkins | 72—97 |
| 1,957,916 | 5/1934 | Stiefel | 72—97 |
| 2,306,827 | 12/1942 | Mohan | 72—97 |
| 2,316,117 | 4/1943 | Tilley | 214—338 |
| 3,081,639 | 3/1963 | Hauptmann | 74—25 |
| 3,101,015 | 8/1963 | Schuetz | 72—97 |

RICHARD J. HERBST, *Primary Examiner.*

H. D. HOINKES, *Assistant Examiner.*